March 31, 1970     H. MENELL ETAL     3,503,829

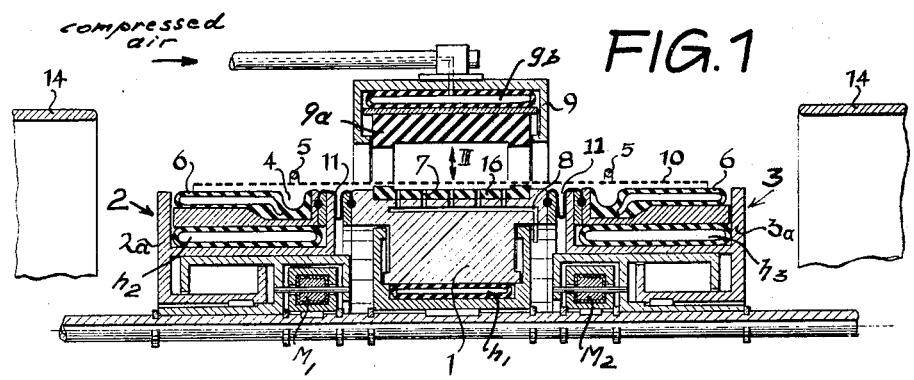
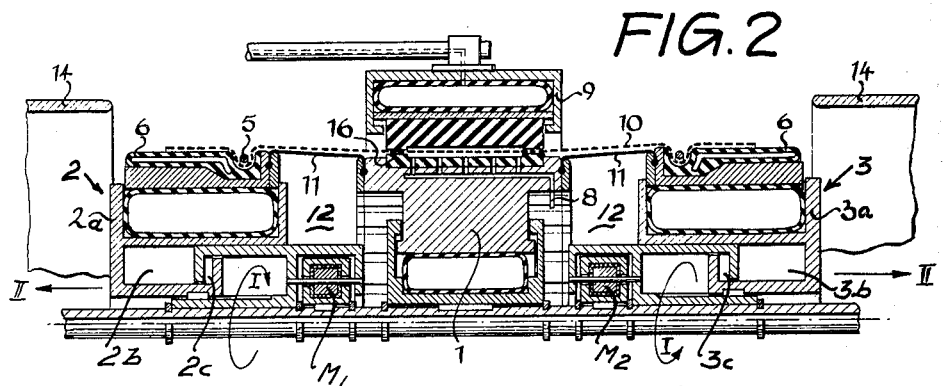
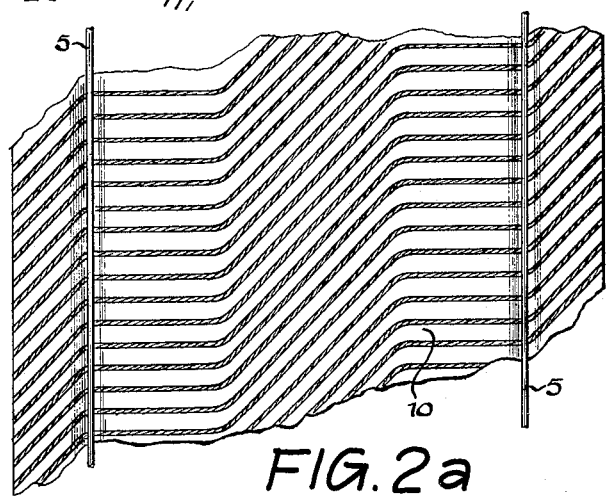

PNEUMATIC TIRE BUILDING MACHINE

Filed Aug. 24, 1966     2 Sheets-Sheet 2

INVENTORS:
Hans Menell
Günter Johannes
Heinrich Nädler
Walter Scheithauer

United States Patent Office 3,503,829
Patented Mar. 31, 1970

3,503,829
PNEUMATIC TIRE BUILDING MACHINE
Hans Menell, Ahlem, Günter Johannes, Hannover, Heinrich Nädler, Hagen, and Walter Scheithauer, Meyenfeld, Germany, assignors to Continental Gummi-Werke Aktiengesellschaft, Hannover, Germany
Filed Aug. 24, 1966, Ser. No. 574,603
Claims priority, application Germany, Aug. 25, 1965, C 36,729
Int. Cl. B29h 17/12, 17/22, 17/11
U.S. Cl. 156—401                    8 Claims

ABSTRACT OF THE DISCLOSURE

A tire building drum including a central section and two marginal end sections provided with inflatable bodies adapted to roll in axial direction such that all three sections are variable in diameter and the two end sections primarily are rotatable though axially movable relative to the central section. Bead cores of an unvulcanized tire casing are adapted directly to hold fabric plies collectively in annular laterally recessed grooves exclusively in the end sections. Changeable diameter clamping holds the fabric plies only as to the central section while rotating of the end sections to which fabric plies are held by the bead cores results in substantially right angled displacement of the fabric thread direction relative to circumferential direction of the plies about the central section.

---

Figure 3:
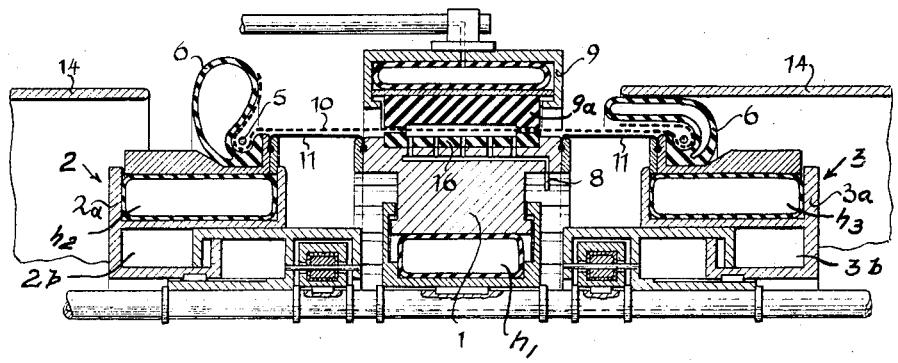
Figure 4:
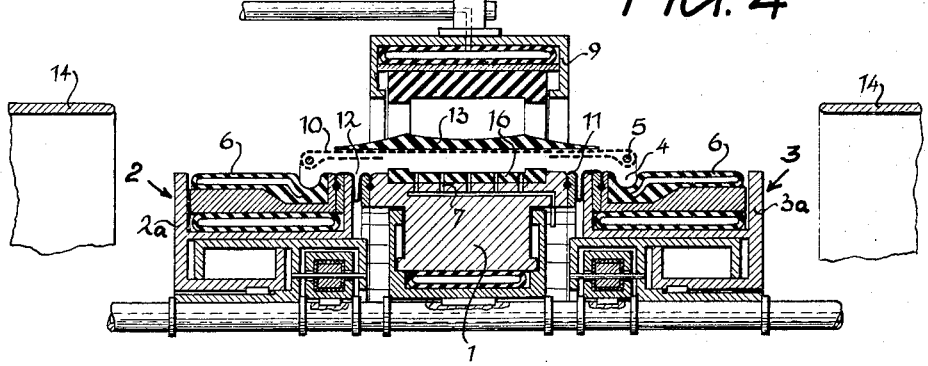

The present invention relates to a tire building machine with a preferably cylindrical tire building drum which comprises a central section and two marginal sections arranged at both sides of said central section and provided with inflatable bodies adapted to roll in axial direction, the arrangement being such that the central section as well as the marginal sections of the drum can be varied with regard to the diameter thereof.

It is an object of the present invention to provide a pneumatic tire building machine which will be able by simple structural means to produce pneumatic tires with reinforcing threads which are parallel to each other.

It is another object of this invention to provide a pneumatic tire building machine which will make it possible in the zenith portion, i.e. that tire area which coincides approximately with the tread surface, to obtain an angular location of the reinforcing threads which differs from the angular location of the reinforcing threads in the side walls.

These and other objects and advantages of the invention will appear more clearly from the following specification in connection with the accompanying drawing, in which:

FIGS. 1, 2, 3 and 4 diagrammatically illustrate a tire building machine according to the invention in different stages of operation.

FIG. 2a shows on a larger scale than that of FIGS. 1 and 2 the course of the threads after the marginal or end sections of the drum have been rotated relative to each other.

The tire building machine according to the present invention, which comprises a preferably cylindrical tire drum having a central section and two marginal or end sections at opposite sides of said central section and inflatable bodies adapted to roll in axial direction of said tire building drum, and in which all of said three sections are variable in diameter, is characterized primarily in that the two end sections are rotatable relative to the central section and are provided with depressions for receiving the bead cores of the unvulcanized tire.

Inasmuch as the arrangement and the direction of the reinforcing threads are of foremost importance for the behavior of the tire in its operative position, it is possible by influencing the location of the reinforcing threads in the unvulcanized tire to realize certain effects. Thus, in various individual instances it is desirable to have the reinforcing threads in the zenith portion, i.e. in the portion which coincides approximately with the tread surface, to occupy an angular position which differs from the angular position of the reinforcing threads in the lateral portions of the tire. This can be realized without difficulties by means of the tire building machine according to the present invention by fixedly locating the unvulcanized tire in the respective areas on the tire building drum, and by then turning the drum sections, which are movable relative to each other, to the desired extent. For fixedly locating the lateral tire portions, there are employed the bead cores which in customary manner are slipped from both sides onto the tire building drum and the unvulcanized tire thereon. By increasing the tire diameter, the thus mounted bead cores are then placed under pulling stress.

On the other hand, for purposes of fixedly locating the unvulcanized tire on the central section of the drum, special steps are necessary which aim at an increase of the frictional connection with the drum wall. According to one of the features of the present invention, it is possible for this purpose to provide the central section with a plurality of bores which are distributed over the circumference of said central section and which extend through the drum wall while being connected to a source of low pressure or negative pressure. This embodiment, which takes advantage of the atmospheric pressure, simultaneously offers the advantage that after completing the tire building operations, the finished raw tire can be easily detached from the drum by introducing compressed air into the bores through which previously a negative pressure was conveyed. Selectively, however, either in lieu thereof or in addition thereto there may also be provided a clamping ring which extends around the central section of the drum and over a portion of its axial length. This clamping ring can be reduced from a diameter which is considerably greater than the diameter of the drum to a diameter at which said clamping ring engages the fabric layers of the raw tire as built up on said drum. In the thus fixedly located layers of fabric, the directional angle of the thread will be maintained in its original magnitude, whereas by turning the drum end sections relative to the drum central section, changes in the direction of the thread extension will occur in the transfer or merging areas.

The direction of rotation of the drum end sections will for reasons inherent in the tire construction generally be counter to each other. The magnitude of the angle of distortion and thus the magnitude of the angle of the change in the direction of the threads over the tire circumference can be adjusted at random and can reach the magnitude of 90°.

By turning the individual raw tire sections angularly relative to each other, an undesired loosening of the thread combine may occur. This will be avoided according to a further feature of the present invention by designing the rotatable end sections of the building drum so as to be also displaceable in axial direction relative to the stationary central section. In view of the axial movement of the outer drum sections which occurs simultaneously with and proportional to the angular turning movement, the individual threads in the fabric layers remain taut and are secured against uncontrollable displacements. The intermediate chamber which forms with the axial movement between the individual sections of the drum wall is advantageously bridged by a sleevelike annular body of an elastic deformable material as for instance rubber or a rubber-like synthetic material so that the closed drum surface will in no phase of the building-up operation, be interrupted.

Referring now to the drawing in detail, the drawing shows a three-sectional tire building drum in its most important working phases during the building up of a pneumatic tire of corresponding conditions, while for the sake of simplicity, only one-half of the tire building drum is shown in each figure.

The tire building drum as shown in the drawings, which forms the most essential part of a tire building machine, comprises a central section 1 and the two end sections 2, 3. Each of the end sections supports an inflatable body 6 which in deflated condition takes on a relatively flat form in which it lies on the drum wall. After compressed air is admitted into the inflatable bodies 6, they tend to lift themselves off the drum wall as shown in FIG. 3. The operations inherent thereto which primarily aim at the folding-over of the fabric marginal portions about the bead cores are known per se and do not form an object of the present invention. The foot portions of the inflatable bodies, which foot portions serve for fastening the inflatable bodies to the end sections, are provided near the central section 1 with recesses in the form of round annular grooves 4 for receiving the bead cores 5 as shown in FIGS. 2 and 3. The two end sections 2 and 3 are rotatable relative to the central section 1 in opposite direction with regard to each other (FIG. 2 indicated by arrows I) and also are displaceable in axial direction as indicated by the arows II. For purposes of bringing about the axial displacement of the end sections 2 and 3, the said end sections 2 and 3 are respectively provided with fluid operable pistons 2a and 3a reciprocable in annular cylinders in the axial direction of the tire building drum. The turning movement of said end sections 2 and 3 is brought about by circular piston motors M1, M2 respectively operatively connected to end sections 2 and 3. The relative movements may be initiated independently of the expansion condition of the building drum and can be extended over angular sizes of strokes which are adjustable at random. For securing the non-vulcanized tires against disadvantageous distortions in the central portion thereof during the course of the movements, the central section of a drum 1 is provided over a portion of its length at the surface thereof with a rubber sleeve 16 having bores 7 extending all the way through. The bores 7 in their turn are adapted alternately through a conduit 8 to be connected to an under-pressure source or an over-pressure source. In this way, it is possible selectively to subject the inner circumference of the raw tire to the pressure which is reduced or increased with regard to the outer atmospheric pressure. In order to aid the thus produced pressing force, there is additionally provided an elastically deformable clamping ring 9 which normally surrounds the central section 1 in the range of the rubber sleeve 6 at a distance and is adapted by reducing its inner diameter to firmly engage the drum wall or the raw tire fabric layers built up thereon. As will be seen from the drawings, the clamping ring 9 includes an elastic compressible rubber ring 9a adapted to be acted upon by an inflatable hose 9b.

At the start of the tire building operations, the building drum occupies the position shown in FIG. 1 in which the drum sections 1, 2 and 3 have been moved toward each other and form a unit and have a small diameter. Starting from this condition, first the fabric layers 10 are deposited and the bead cores 5 are slipped onto the fabric layer portions above the marginal sections 2, 3 and are aligned with regard to the annular groove-like recesses 4. Together with the subsequent increase in the drum diameter (FIGS. 2 and 3) by inflating hoses h1, h2, h3, the pull-resistant bead cores 5 further enter the recesses 4 and thereby clamp the fabric layers 10 fast onto the end or marginal sections 2, 3. After, by connecting the bores 7 in the rubber sleeve 16 to a vacuum and if desired, simultaneously contracting clamping ring 9, the fabric layers 10 will also on said central section 1 be secured against undesired movements relative to the drum wall. The end sections 2 and 3 can then be rotated relative to each other by circular piston motors M1, M2, in the direction of the arrow I and can at the same time be axially movable fluid operable pistons 2a, 3a be axially withdrawn from the central section 1 in the direction of the arrows II (FIG. 2). The intermediate spaces which will form at opposite sides are bridged by the elastically deformable rubber rings or sleeves 11. The extent to which the two drum ends are rotated relative to each other as well as the axial spacing depend on the desired fabric angle, i.e., the angle of the reinforcing threads.

The further working operations up to the finishing of the unvulcanized tire take place in a manner known per se. By means of the inflatable bodies 6 and the slidable bells or members 14, the fabric marginal portions are folded about the bead cores 5 and are folded back as shown in FIG. 3 from the left to the right half of the picture in a progressive manner. After a subsequent deposit of the tread strip 13, the building drum 1, 2, 3, may be collapsed and the unvulcanized tire can be detached by introducing compressed air into the collecting conduit 8. The course of the threads of the thus built-up tire is shown in FIG. 2a. FIG. 4 shows the drum again in collapsed condition with the end sections 2, 3 again moved back towards the center section 1.

It is, of course, to be understood that the present invention is, by no means, limited to the particular construction shown in the drawing but also comprises any modifications that will appear to those skilled in the art.

What is claimed is:

1. A tire building machine comprising: a generally flat drum comprising a central section and end sections, inflatable bodies on said end sections adapted to have their axially outer end parts rolled inwardly over the axially inner parts thereof, said drum being adapted to receive fabric plies for a vulcanizable tire casing, said central section and said end sections being adjustable in diameter, annular recessed grooves in said end sections disposed axially inwardly from said outer end parts of said inflatable bodies, and annular bead cores for holding at least laterally displaced fabric plies received therewith directly in said annular laterally recessed grooves of said end sections and collectively being rotatable relative to said central section to effect a displacement in the thread direction during rotation of fabric plies mounted on said drum particularly where the plies pass from said central section to said end sections.

2. A tire building machine according to claim 1, in which said bead core and fabric-plies receiving grooves are particularly in the axial ends of said end sections nearest said central section.

3. A tire building machine according to claim 2, in which said bead core and fabric-plies receiving grooves also are in the axially inner ends of said inflatable bodies.

4. A tire building machine according to claim 3, in which said drum end sections are rotatable in respectively opposite directions relative to each other and also with respect to said central section.

5. A tire building machine according to claim 4, in which said drum end sections also are moveable axially relative to said central section.

6. A tire building machine according to claim 5, in which an axially resilient annular member is provided at each end of said central section and is connected to the adjacent ends of the central section and the pertaining end section to bridge the gap between said central section and said end sections when the latter move away from said central section.

7. A tire building machine according to claim 6, in which said central section includes passage means communicating with the peripheral surface of the central section and adapted for selective connection to a source of suction and to a source of pressure.

8. A tire building machine according to claim 7, which includes a separate clamping ring surrounding the central section over at least a part of the axial length of the central section and variable in diameter respectively from a dimension where it clamps only plies to said central section in particular to a dimension where it has substantial radial clearance from said central section.

References Cited

UNITED STATES PATENTS

| | | | |
|---|---|---|---|
| 2,954,818 | 10/1960 | Frohlich | 156—394 |
| 2,967,564 | 1/1961 | Niclas et al. | 156—394 |
| 3,044,533 | 7/1962 | Lowe | 156—416 X |
| 3,127,294 | 3/1964 | Porter | 156—416 X |
| 3,138,510 | 6/1964 | Hindin et al. | 156—416 X |
| 3,188,260 | 6/1965 | Nebout | 156—415 |
| 3,281,305 | 10/1966 | Nadler | 156—416 X |
| 3,396,066 | 8/1968 | Nadler | 156—401 |

FOREIGN PATENTS 964,686    7/1964    Great Britain.

JOHN T. GOOLKASIAN, Primary Examiner

C. B. COSBY, Assistant Examiner

U.S. Cl. X.R.

156—133, 416